(12) United States Patent
Kubo et al.

(10) Patent No.: US 10,830,931 B2
(45) Date of Patent: Nov. 10, 2020

(54) INFRARED CUT FILTER, IMAGING DEVICE, AND METHOD FOR PRODUCING INFRARED CUT FILTER

(71) Applicant: Nippon Sheet Glass Company, Limited, Tokyo (JP)

(72) Inventors: Yuichiro Kubo, Tokyo (JP); Katsuhide Shimmo, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 56 days.

(21) Appl. No.: 15/542,017

(22) PCT Filed: Jul. 8, 2016

(86) PCT No.: PCT/JP2016/003254
§ 371 (c)(1),
(2) Date: Jul. 6, 2017

(87) PCT Pub. No.: WO2017/006571
PCT Pub. Date: Jan. 12, 2017

(65) Prior Publication Data
US 2018/0003872 A1 Jan. 4, 2018

(30) Foreign Application Priority Data
Jul. 9, 2015 (JP) .................................. 2015-137675

(51) Int. Cl.
*G02B 5/22* (2006.01)
*B05D 1/00* (2006.01)
*G02B 5/20* (2006.01)

(52) U.S. Cl.
CPC ............. *G02B 5/223* (2013.01); *B05D 1/005* (2013.01); *G02B 5/208* (2013.01)

(58) Field of Classification Search
CPC ......... G02B 5/223; G02B 5/208; B05D 1/005
See application file for complete search history.

(56) References Cited

U.S. PATENT DOCUMENTS

| 7,025,908 B1 | 4/2006 | Hayashi et al. |
| 2005/0008969 A1 | 1/2005 | Miyako et al. |

(Continued)

FOREIGN PATENT DOCUMENTS

| JP | 2001042230 A | 2/2001 |
| JP | 2001154015 A | 6/2001 |

(Continued)

OTHER PUBLICATIONS

International Search Report for PCT/JP2016/003254, dated Sep. 20, 2016, 5 pages including English translation.

*Primary Examiner* — William R Alexander
*Assistant Examiner* — Ephrem Z Mebrahtu
(74) *Attorney, Agent, or Firm* — Hamre, Schumann, Mueller & Larson, P.C.

(57) ABSTRACT

The infrared cut filter of the present invention includes an organic dye-containing layer and a copper phosphonate-containing layer containing fine particles of copper phosphonate. The organic dye-containing layer contains an organic dye so as to have a spectral transmittance that decreases from 70% or more to 50% or less with increasing wavelength in a wavelength range between a wavelength 50 nm shorter than a cut-off wavelength of the infrared cut filter and a wavelength 50 nm longer than the cut-off wavelength of the infrared cut filter.

20 Claims, 6 Drawing Sheets

(56) References Cited

U.S. PATENT DOCUMENTS

| | | | |
|---|---|---|---|
| 2008/0241492 A1* | 10/2008 | Demartin Maeder | ... B41M 3/14 |
| | | | 428/211.1 |
| 2011/0049730 A1* | 3/2011 | Schmid | ............... C23C 16/0272 |
| | | | 257/787 |
| 2013/0094075 A1 | 4/2013 | Saitoh et al. | |
| 2014/0063597 A1 | 3/2014 | Shimmo et al. | |
| 2015/0346404 A1 | 12/2015 | Bak et al. | |
| 2017/0219749 A1* | 8/2017 | Hou | ....................... G03B 11/00 |

FOREIGN PATENT DOCUMENTS

| | | | | |
|---|---|---|---|---|
| JP | 2008165215 A | 7/2008 | | |
| JP | 2009242650 A | 10/2009 | | |
| JP | 2011203467 A | 10/2011 | | |
| JP | 5400033 B2 * | 1/2014 | ............ | C07F 9/3808 |
| JP | 2014052482 A | 3/2014 | | |
| JP | 2014197170 A | 10/2014 | | |
| WO | WO-2009123016 A1 * | 10/2009 | ............. | G02B 5/208 |
| WO | 2011158635 A1 | 12/2011 | | |

* cited by examiner

INFRARED CUT FILTER, IMAGING DEVICE, AND METHOD FOR PRODUCING INFRARED CUT FILTER

TECHNICAL FIELD

The present invention relates to an infrared cut filter, an imaging device, and a method for producing an infrared cut filter.

BACKGROUND ART

In imaging devices such as digital cameras, Silicon(Si)-based semiconductor devices such as a charge coupled device (CCD) and a complementary metal oxide semiconductor (CMOS) are used as imaging sensors. Such an imaging sensor made of Si-based semiconductor devices is sensitive to infrared light (in particular near-infrared light) and has wavelength characteristics incompatible with the visual sensitivity. An imaging device is therefore provided with an infrared cut filter disposed ahead of an imaging sensor so that an image obtained by the imaging sensor comes closer to an image as perceived by humans.

For example, Patent Literature 1 describes a composite filter including an absorptive cut filter (light-absorbing element) and a reflective cut coating (interference film) provided on the surface of the absorptive cut filter.

Patent Literature 2 describes an infrared cut filter made up of an infrared absorber and an infrared reflector bonded together. The infrared absorber is fabricated by forming an anti-reflection film (AR coating) on one principal surface of an infrared absorbing glass. The infrared absorbing glass is a blue glass in which a dye such as copper ions is dispersed. The anti-reflection film is formed by vacuum depositing a single layer made of $MgF_2$, a multilayer film made of $Al_2O_2$, $ZrO_2$, and $MgF_2$, or a multilayer film made of $TiO_2$ and $SiO_2$ on the one principal surface of the infrared absorbing glass using a vacuum deposition apparatus. The infrared reflector is fabricated by forming an infrared reflecting film on one principal surface of a transparent substrate. The infrared reflecting film is a multilayer film composed of first thin films made of a high refractive index material such as $TiO_2$ and second thin films made of a low refractive index material such as $SiO_2$, the first and second thin films being laminated alternately on top of each other. The infrared reflecting film is formed by vacuum deposition.

Patent Literature 3 describes an optical film having a near-infrared absorbing layer including a transparent resin and a specific diimmonium dye contained in the transparent resin. Table 1 of Patent Literature 3 shows that optical films according to examples had a near-infrared transmittance more than 10% at 850 nm.

Patent Literature 4 describes an optical filter including a near-infrared absorbing layer that contains a component composed of a specific phosphoric acid ester compound and copper ions and in which the phosphorus atom content is 0.4 to 1.3 moles per mole of copper ions and the copper ion content is 2 to 40 wt %.

CITATION LIST

Patent Literature

Patent Literature 1: JP 2001-42230 A
Patent Literature 2: WO 2011/158635 A1
Patent Literature 3: JP 2008-165215 A
Patent Literature 4: JP 2001-154015 A

SUMMARY OF INVENTION

Technical Problem

When infrared light is cut off by means of reflection by an interference film as is the case with the reflective cut coating of Patent Literature 1 and the infrared reflecting film of Patent Literature 2, the infrared shielding performance may vary with the incident angle of light. This may cause a phenomenon where the hue of an image obtained differs between the central portion and peripheral portion of the image; for example, the peripheral portion of the obtained image may have a more bluish hue. In addition, the formation of coatings which cut off infrared light by means of reflection generally requires vacuum deposition or sputtering, which makes the production of infrared cut filters complicated.

In the technique described in Patent Literature 3, the specific diimmonium dye can only absorb infrared light in a limited wavelength range. A possible option for achieving desired infrared absorptivity is to further incorporate a dye other than the specific diimmonium dye into the near-infrared absorbing layer. However, dispersing different dyes in a transparent resin may be difficult due to interaction between the dyes.

The near-infrared absorbing layer described in Patent Literature 4 may fail to achieve desired optical properties by itself.

In view of such circumstances, the present invention aims to provide an infrared cut filter that is easy to produce and that is capable of achieving desired optical properties without being combined with a reflective infrared cut filter or reflective infrared cut coating.

Solution to Problem

The present invention provides an infrared cut filter including:
an organic dye-containing layer containing an organic dye so as to have a spectral transmittance that decreases from 70% or more to 50% or less with increasing wavelength in a wavelength range between a wavelength 50 nm shorter than a cut-off wavelength of the infrared cut filter and a wavelength 50 nm longer than the cut-off wavelength; and
a copper phosphonate-containing layer containing fine particles of copper phosphonate.

The present invention also provides an imaging device including:
the above infrared cut filter; and
an imaging sensor on which light passing through the infrared cut filter is incident.

The present invention also provides a method for producing an infrared cut filter, the infrared cut filter including: an organic dye-containing layer containing an organic dye so as to have a spectral transmittance that decreases from 70% or more to 50% or less with increasing wavelength in a wavelength range between a wavelength 50 nm shorter than a cut-off wavelength of the infrared cut filter and a wavelength 50 nm longer than the cut-off wavelength; and a copper phosphonate-containing layer containing fine particles of copper phosphonate,
the method including applying a coating liquid containing the organic dye by spin coating to form the organic dye-containing layer.

Advantageous Effects of Invention

The above infrared cut filter can achieve desired optical properties without being combined with a reflective infrared cut filter or reflective infrared cut coating. That is, the infrared cut filter can achieve such optical properties that the spectral transmittance drastically decreases in a wavelength range around the cut-off wavelength and that the infrared absorptivity is high over a broad infrared wavelength range (for example, from 800 nm to 1100 nm). In addition, the organic dye-containing layer and the copper phosphonate-containing layer can be formed without employing a process such as vacuum deposition or sputtering, and thus the infrared cut filter is easy to produce. With the above method for producing an infrared cut filter, the cut-off wavelength of the infrared cut filter can be adjusted easily and finely.

DESCRIPTION OF EMBODIMENTS

Hereinafter, embodiments of the present invention will be described with reference to the drawings. The following description relates to examples of the present invention, and the present invention is not limited to these examples.

Figure 1:
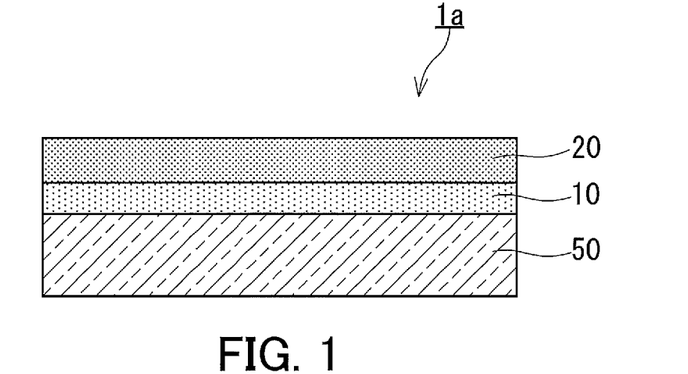
FIG. 1 is a cross-sectional view of an infrared cut filter according to an embodiment of the present invention.

As shown in FIG. 1, an infrared cut filter 1a includes an organic dye-containing layer 10 and a copper phosphonate-containing layer 20. The organic dye-containing layer 10 contains a specific organic dye. This allows the spectral transmittance of the organic dye-containing layer 10 to decrease from 70% or more to 50% or less with increasing wavelength in a wavelength range between a wavelength 50 nm shorter than the cut-off wavelength of the infrared cut filter 1a and a wavelength 50 nm longer than the cut-off wavelength of the infrared cut filter 1a. The spectral transmittance of the organic dye-containing layer 10 may decrease from 80% or more to 20% or less with increasing wavelength in a wavelength range between a wavelength 100 nm shorter than the cut-off wavelength of the infrared cut filter 1a and a wavelength 100 nm longer than the cut-off wavelength of the infrared cut filter 1a. The "cut-off wavelength" as defined herein refers to a wavelength which is within a part of the visible region close to the near-infrared region or the near-infrared region, where the spectral transmittance of the infrared cut filter 1a decreases with increasing wavelength, and at which the spectral transmittance of the infrared cut filter 1a is 50%. The "cut-off wavelength" of an infrared cut filter other than the infrared cut filter 1a also refers to a wavelength which is within a part of the visible region close to the near-infrared region or the near-infrared region, where the spectral transmittance of the infrared cut filter decreases with increasing wavelength, and at which the spectral transmittance of the infrared cut filter is 50%. The copper phosphonate-containing layer 20 contains fine particles of copper phosphonate. The "fine particles" as defined herein refer to particles having an average particle diameter of 5 nm to 200 nm. The average particle diameter can be determined, for example, through observation of 50 or more fine particles of copper phosphonate with a scanning electron microscope.

Due to containing fine particles of copper phosphonate, the copper phosphonate-containing layer 20 exhibits high infrared absorptivity in a broad infrared wavelength range (e.g., from 800 nm to 1100 nm). In other words, the infrared cut filter 1a which includes the copper phosphonate-containing layer 20 has a low spectral transmittance (e.g., 5% or less on average) in a broad infrared wavelength range, particularly in a wavelength range from 800 nm to 1000 nm. The spectral transmittance of the copper phosphonate-containing layer 20 may not drastically decrease with increasing wavelength in a wavelength range around the cut-off wavelength of the infrared cut filter 1a. However, since the infrared cut filter 1a includes the organic dye-containing layer 10 in addition to the copper phosphonate-containing layer 20, the spectral transmittance of the infrared cut filter 1a drastically decreases with increasing wavelength in a wavelength range around the cut-off wavelength of the infrared cut filter 1a. For this reason, the infrared cut filter 1a has optical properties desirable for an imaging device such as a digital camera without being combined with a reflective infrared cut filter or reflective infrared cut coating.

The cut-off wavelength of the infrared cut filter 1a is, for example, in the wavelength range from 620 nm to 680 nm. When the cut-off wavelength of the infrared cut filter 1a is in this wavelength range, the infrared cut filter 1a can achieve optical properties desirable for an imaging device such as a digital camera. This is because the infrared cut filter 1a permits visible light to pass therethrough as much as possible while cutting off harmful infrared light as much as possible. To achieve optical properties more desirable for an imaging device such as a digital camera, it is desirable for the infrared cut filter 1a to have optical properties meeting the following requirements (1), (2), and (3).

(1) The spectral transmittance in the wavelength range from 450 nm to 600 nm is high (the spectral transmittance is 70% or more, for example). This means that the spectral transmittance in the visible region is high so that a bright image can be obtained.

(2) The spectral transmittance at a wavelength 100 nm longer than the cut-off wavelength is low (the spectral transmittance is, for example, 5% or less and desirably 3% or less). Meeting this requirement means that the light transmittance in the infrared region drastically decreases within a narrow wavelength range and that a larger amount of light in the visible region can be transmitted to make a bright image more likely to be obtained.

(3) The spectral transmittance in the wavelength range from 800 to 1100 nm is low (the spectral transmittance is, for example, 5% or less and desirably 2% or less). This means that a larger amount of light in the infrared region can be cut off. Such a property is naturally desired.

The organic dye to be contained in the organic dye-containing layer 10 is not particularly limited, and an organic dye having infrared absorptivity suitable for imparting the above desired optical properties to the organic dye-containing layer 10 can be selected from organic dyes such as a cyanine dye, a phthalocyanine dye, a squarylium dye, a diimmonium dye, and an azo dye. For example, when the cut-off wavelength of the infrared cut filter 1a is in the wavelength range from 620 nm to 680 nm, an organic dye having a maximum absorption wavelength in 650 nm to 900 nm can be used as the organic dye to be contained in the organic dye-containing layer 10, and the use of an organic dye having a maximum absorption wavelength in 700 nm to 850 nm is more desired. The organic dye to be contained in the organic dye-containing layer 10 is desirably an organic dye having such a property that an infrared cut filter consisting only of a transparent glass substrate and a layer formed on the transparent glass substrate using a material identical to that for forming the organic dye-containing layer 10 has a cut-off wavelength which is longer than the cut-off wavelength of the infrared cut filter 1a and is within the wavelength range from 620 nm to 720 nm. In this case, the cut-off wavelength of the infrared cut filter 1a is likely to be in the wavelength range from 620 nm to 680 nm. The organic dye-containing layer 10 may contain a single organic dye or may contain two or more different organic dyes. The type of the organic dye(s) to be contained in the organic dye-containing layer 10 is selected, for example, so that the spectral transmittance of the organic dye-containing layer 10 is 80% or more on average in the wavelength range from 450 nm to 600 nm.

The mass of the organic dye contained in the organic dye-containing layer 10 is, for example, 0.3% to 8% of the mass of total solids finally contained in the organic dye-containing layer 10. In this case, the infrared cut filter 1a can more reliably exhibit desired optical properties.

The organic dye-containing layer 10 is formed, for example, of a matrix resin and an organic dye dispersed in the matrix resin. The matrix resin of the organic dye-containing layer 10 is a resin that is transparent to visible light and near-infrared light and in which an organic dye can be dispersed. As the matrix resin of the organic dye-containing layer 10 there can be used, for example, a resin such as polyester, polyacrylic, polyolefin, polycarbonate, polycycloolefin, or polyvinyl butyral.

The thickness of the organic dye-containing layer 10 is, for example, 0.5 µm to 5 µm. In this case, the infrared cut filter 1a can more reliably exhibit desired optical properties. An increase in the thickness of the organic dye-containing layer 10 leads to an increase in light absorbance, and a decrease in light transmittance, of the organic dye-containing layer 10. Thus, an increase in the thickness of the organic dye-containing layer 10 is likely to reduce the cut-off wavelength of the infrared cut filter 1a. That is, the cut-off wavelength of the infrared cut filter 1a can be adjusted by varying the thickness of the organic dye-containing layer 10. For example, when the thickness of the organic dye-containing layer 10 is in the range mentioned above, the infrared cut filter 1a is likely to have a desired cut-off wavelength. The thickness of the organic dye-containing layer 10 can be adjusted, for example, by varying the conditions under which a coating liquid for forming the organic dye-containing layer 10 is applied. In particular, when the coating liquid for forming the organic dye-containing layer 10 is applied by spin coating, the thickness of the organic dye-containing layer 10 can be adjusted by varying the rotation speed of the spin coater used. For example, when the rotation speed of the spin coater is low, the organic dye-containing layer 10 can be formed to be relatively thick. When the coating liquid for forming the organic dye-containing layer 10 is applied by spin coating, the cut-off wavelength of the infrared cut filter 1a can be finely adjusted by finely controlling the rotation speed of the spin coater.

The fine particles of copper phosphonate which are contained in the copper phosphonate-containing layer 20 are formed, for example, of at least one copper phosphonate selected from the group consisting of copper methylphosphonate, copper ethylphosphonate, copper propylphosphonate, copper butylphosphonate, copper pentylphosphonate, copper vinylphosphonate, and copper phenylphosphonate.

The copper phosphonate-containing layer 20 is formed, for example, of a matrix resin and fine particles of copper phosphonate dispersed in the matrix resin. The matrix resin of the copper phosphonate-containing layer 20 is a resin that is transparent to visible light and near-infrared light and in which fine particles of copper phosphonate can be dispersed. Copper phosphonates have relatively low polarity and are highly dispersible in hydrophobic materials. Thus, for example, a resin having an acrylic group, epoxy group, or phenyl group can be used as the matrix resin of the copper phosphonate-containing layer 20. It is particularly desirable to use a phenyl group-containing resin as the matrix resin of the copper phosphonate-containing layer 20. In this case, the matrix resin of the copper phosphonate-containing layer 20 has high heat resistance. Polysiloxanes (silicone resins) are resistant to thermal decomposition and are highly transparent to visible light and near-infrared light, as well as having high heat resistance. That is, polysiloxanes possess advantageous properties in terms of use as the materials of optical elements. Thus, it is also desirable to use a polysiloxane as the matrix resin of the copper phosphonate-containing layer 20. Specific examples of polysiloxanes that can be used as the matrix resin of the copper phosphonate-containing layer 20 include KR-255, KR-300, KR-2621-1, KR-211, KR-311, KR-216, KR-212, and KR-251. All of these silicone resins are those manufactured by Shin-Etsu Chemical Co., Ltd.

The spectral transmittance of the copper phosphonate-containing layer 20 in the wavelength range from 800 nm to 1100 nm is, for example, 10% or less and desirably 5% or less. The spectral transmittance of the copper phosphonate-containing layer 20 can be measured, for example, using an infrared cut filter consisting only of a transparent glass substrate and a layer formed on the transparent glass substrate using a material identical to that for forming the copper phosphonate-containing layer 20. The mass of the fine particles of copper phosphonate contained in the copper phosphonate-containing layer 20 is, for example, 15% to 45% of the mass of total solids finally contained in the copper phosphonate-containing layer 20. In this case, the infrared cut filter 1a can more reliably exhibit desired optical properties.

The average particle diameter of the fine particles of copper phosphonate contained in the copper phosphonate-containing layer 20 is, for example, 5 nm to 200 nm and desirably 5 nm to 100 nm. When the average particle diameter of the fine particles of copper phosphonate is 5 nm or more, the necessity for any particular step for size reduction of the fine particles of copper phosphonate is eliminated, so that the destruction of the structure of the copper phosphonate can be avoided. When the average particle diameter of the fine particles of copper phosphonate is 200 nm or less, the influence of light scattering such as Mie scattering is substantially negligible, so that the decrease in light transmittance can be prevented and that the deterioration of the properties such as contrast and haze of an image formed by an imaging device can be prevented. When the average particle diameter of the fine particles of copper phosphonate is 100 nm or less, the influence of Rayleigh scattering is reduced, so that the copper phosphonate-containing layer can be more transparent to light in the visible region. This allows the copper phosphonate-containing layer 20 to have properties more desirable for the infrared cut filter 1a.

The thickness of the copper phosphonate-containing layer 20 is, for example, 40 μm to 200 μm. In this case, the infrared cut filter 1a can more reliably exhibit desired optical properties. Specifically, for example, the spectral transmittance of the infrared cut filter 1a in the wavelength range from 800 nm to 1100 nm can be reduced to 5% or less, while the spectral transmittance of the infrared cut filter 1a in the wavelength range from 450 nm to 600 nm can be kept high (70% or more, for example).

As shown in FIG. 1, the infrared cut filter 1a further includes, for example, a transparent substrate 50. The transparent substrate 50 is a substrate made of glass or resin transparent to visible light and near-infrared light. In the infrared cut filter 1a, the organic dye-containing layer 10 is formed on one principal surface of the transparent substrate 50, and the copper phosphonate-containing layer 20 is formed on one principal surface of the organic dye-containing layer 10, the one principal surface of the organic dye-containing layer 10 being opposite to its other principal surface which is in contact with the transparent substrate 50. In this case, for example, the organic dye-containing layer 10 is formed prior to formation of the copper phosphonate-containing layer 20. In other cases, a component used for formation of the organic dye-containing layer 10 may deteriorate the properties to be exhibited by the copper phosphonate-containing layer 20. When the organic dye-containing layer 10 is formed prior to formation of the copper phosphonate-containing layer 20 in production of the infrared cut filter 1a, a majority of such a component having the potential to deteriorate the properties to be exhibited by the copper phosphonate-containing layer 20 is likely to have been eliminated from the organic dye-containing layer 10. Thus, in the infrared cut filter 1a, the deterioration of the properties to be exhibited by the copper phosphonate-containing layer 20 can be prevented.

The organic dye-containing layer 10 can be formed, for example, by the following procedure. First, a matrix resin and an organic dye are added to a solvent to prepare a coating liquid for forming the organic dye-containing layer 10. The coating liquid prepared is applied to a substrate by spin coating or with a dispenser to form a coating for the organic dye-containing layer 10. The coating was then subjected to a given heat treatment and thus hardened. In this manner, the organic dye-containing layer 10 can be formed. It is desirable that the coating liquid containing the organic dye be applied by spin coating to form the organic dye-containing layer 10. In this case, the thickness of the organic dye-containing layer 10 can be finely adjusted by controlling the rotation speed of the spin coater. Thus, the cut-off wavelength of the infrared cut filter 1a can be adjusted easily and finely.

The copper phosphonate-containing layer 20 can be formed, for example, by the following procedure. A copper salt such as copper acetate is added to a given solvent such as tetrahydrofuran (THF) and dissolved in the solvent by means such as ultrasonication. A phosphoric acid ester is added to the resulting solution to prepare a liquid A. A phosphonic acid such as ethylphosphonic acid is added to a given solvent such as THF, and the mixture is stirred to prepare a liquid B. The liquid A and the liquid B are mixed to prepare a solution mixture, which is stirred at room temperature for a dozen hours or so. After that, a given solvent such as toluene is added to the solution, which is heated at a given temperature to evaporate the solvent. Next, the solution is centrifuged to remove impurities, and a given solvent such as toluene is added to the centrifuged solution, which is heated at a given temperature to evaporate the solvent. A dispersion of fine particles of copper phosphonate is thus prepared. A matrix resin such as a silicone resin is then added to the dispersion of fine particles of copper phosphonate, and the mixture is stirred. A coating liquid for forming the copper phosphonate-containing layer 20 is thus prepared. The coating liquid prepared is applied to a substrate by spin coating or with a dispenser to form a coating for the copper phosphonate-containing layer 20. The coating is then subjected to a given heat treatment and thus hardened. In this manner, the copper phosphonate-containing layer 20 can be formed.

Figure 2:
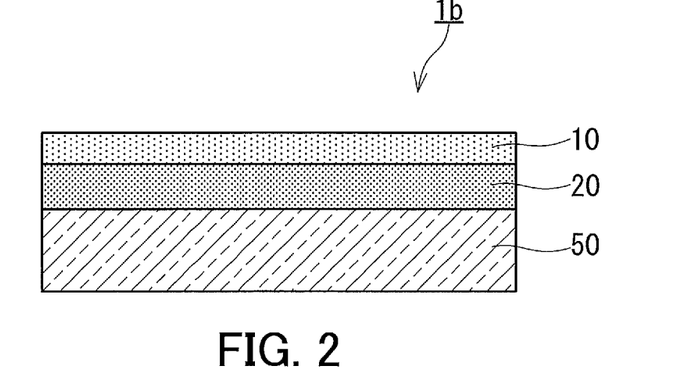
FIG. 2 is a cross-sectional view of an infrared cut filter according to a variant of the present invention.

In another embodiment, the infrared cut filter 1a may be modified to give an infrared cut filter 1b shown in FIG. 2. In the infrared cut filter 1b, the copper phosphonate-containing layer 20 is formed on one principal surface of the transparent substrate 50, and the organic dye-containing layer 10 is formed on one principal surface of the copper phosphonate-containing layer 20, the one principal surface of the copper phosphonate-containing layer 20 being opposite to its other principal surface which is in contact with the transparent substrate 50. In this case, for example, the copper phosphonate-containing layer 20 is formed prior to formation of the organic dye-containing layer 10. In other cases, a component used for formation of the copper phosphonate-containing layer 20 may deteriorate the properties to be exhibited by the organic dye-containing layer 10. When the copper phosphonate-containing layer 20 is formed prior to formation of the organic dye-containing layer 10 in production of the infrared cut filter 1b, a majority of such a component having the potential to deteriorate the properties to be exhibited by the organic dye-containing layer 10 is likely to have been eliminated from the copper phosphonate-containing layer 20. Thus, in the infrared cut filter 1b, the deterioration of the properties to be exhibited by the organic dye-containing layer 10 can be prevented.

Figure 3:
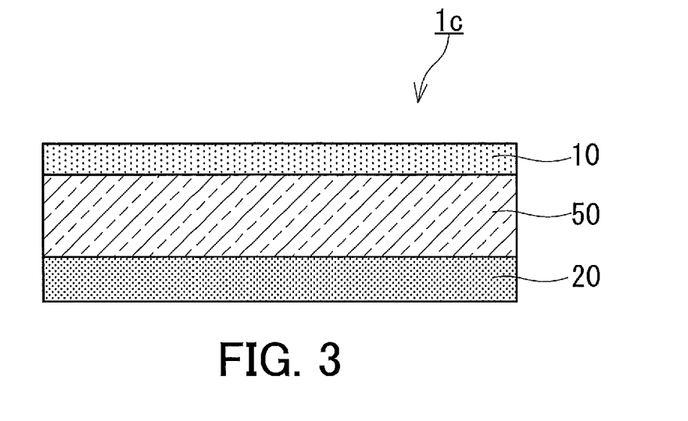
FIG. 3 is a cross-sectional view of an infrared cut filter according to a variant of the present invention.

In still another embodiment, the infrared cut filter 1a may be modified to give an infrared cut filter 1c shown in FIG. 3. In the infrared cut filter 1c, the copper phosphonate-containing layer 20 is formed on one principal surface of the transparent substrate 50, and the organic dye-containing layer 10 is formed on the other principal surface of the transparent substrate 50. In this case, the properties to be exhibited by the organic dye-containing layer 10 or copper phosphonate-containing layer 20 can be prevented from deteriorating due to interaction between the organic dye-containing layer 10 and the copper phosphonate-containing layer 20.

Figure 4:
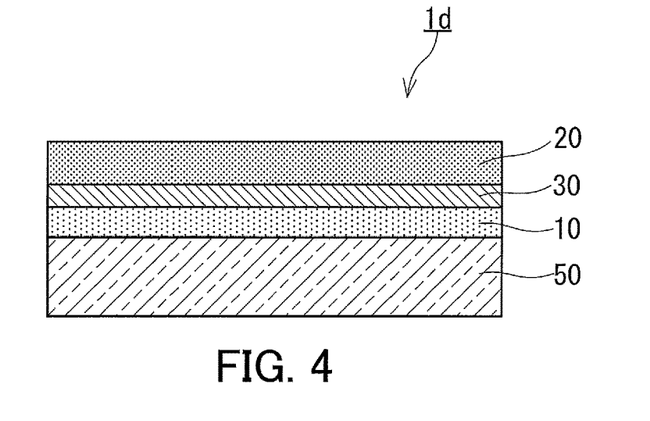
FIG. 4 is a cross-sectional view of an infrared cut filter according to a variant of the present invention.

In still another embodiment, the infrared cut filter 1a may be modified to give an infrared cut filter 1d shown in FIG. 4. The infrared cut filter 1d has the same configuration as the infrared cut filter 1a, except for including an intermediate protective layer 30 (passivation layer). The intermediate protective layer 30 is formed between the organic dye-containing layer 10 and the copper phosphonate-containing layer 20 in the thickness direction of the infrared cut filter 1d. In the infrared cut filter 1d, the organic dye-containing layer 10 is disposed closer to the transparent substrate 50 than is the intermediate protective layer 30, and the intermediate protective layer 30 is disposed closer to the transparent substrate 50 than is the copper phosphonate-containing layer 20. In another infrared cut filter, the copper phosphonate-containing layer 20 may be disposed closer to the transparent substrate 50 than is the intermediate protective layer 30, and the intermediate protective layer 30 may be disposed closer to the transparent substrate 50 than is the organic dye-containing layer 10.

When the organic dye-containing layer 10 and the copper phosphonate-containing layer 20 are in contact with each other, interaction between the organic dye-containing layer 10 and the copper phosphonate-containing layer 20 may deteriorate the properties to be exhibited by the organic dye-containing layer 10 or copper phosphonate-containing layer 20. For example, when the copper phosphonate-containing layer 20 is formed on the organic dye-containing layer 10, insufficient removal of impurities from the fine particles of copper phosphonate may cause the organic dye contained in the organic dye-containing layer 10 to be affected by the impurities. When the organic dye-containing layer 10 is formed on the copper phosphonate-containing layer 20, a component such as a curing agent, catalyst, or crosslinking accelerator which is used for formation of the organic dye-containing layer 10 may affect the properties of the copper phosphonate-containing layer 20. In the infrared cut filter 1d, the intermediate protective layer 30 prevents interaction between the organic dye-containing layer 10 and the copper phosphonate-containing layer 20 and thereby prevents deterioration of the properties to be exhibited by the organic dye-containing layer 10 or copper phosphonate-containing layer 20.

The material forming the intermediate protective layer 30 is not particularly limited, as long as interaction between the organic dye-containing layer 10 and the copper phosphonate-containing layer 20 can be prevented. The intermediate protective layer 30 contains, for example, a polysiloxane. In this case, the intermediate protective layer 30 has high heat resistance. The mass of the polysiloxane contained in the intermediate protective layer 30 is, for example, 50% to 99.5% of the total mass of the intermediate protective layer 30.

The intermediate protective layer 30 contains, for example, an epoxy resin. In this case, the intermediate protective layer 30 may or may not contain a polysiloxane. The intermediate protective layer 30 containing an epoxy resin has an improved denseness. The mass of the epoxy resin contained in the intermediate protective layer 30 is, for example, 0.5% to 50% of the mass of total solids finally contained in the intermediate protective layer 30.

The thickness of the intermediate protective layer 30 is, for example, 0.3 µm to 5 µm. In this case, the increase in the thickness of the infrared cut filter 1d is small while interaction between the organic dye-containing layer 10 and the copper phosphonate-containing layer 20 is reliably prevented.

The intermediate protective layer 30 can be formed, for example, by the following procedure. First, a starting material for a polysiloxane and an epoxy resin are added to a given solvent, and the mixture is stirred for a given period of time to prepare a coating liquid for forming the intermediate protective layer 30. In this case, for example, the polysiloxane may be produced by allowing hydrolytic polycondensation of a given alkoxysilane to proceed during the course of the preparation of the coating liquid for forming the intermediate protective layer 30. Next, the coating liquid for forming the intermediate protective layer 30 is applied to the organic dye-containing layer 10 or copper phosphonate-containing layer 20 which is formed beforehand by spin coating. Thus, a coating for the intermediate protective layer 30 is formed. The coating for the intermediate protective layer 30 is then subjected to a given heat treatment and thus hardened. In this manner, the intermediate protective layer 30 can be formed.

Figure 5:
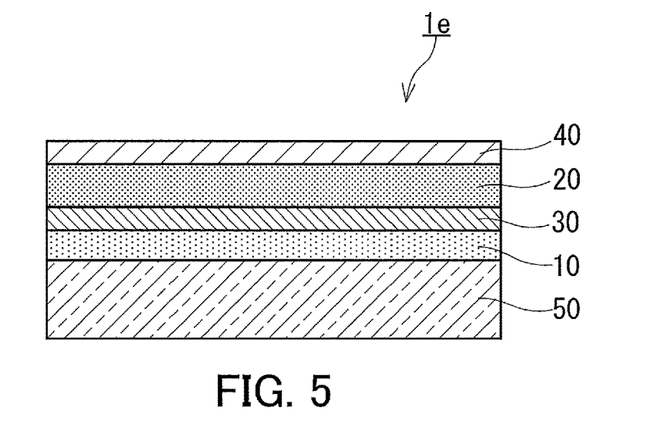
FIG. 5 is a cross-sectional view of an infrared cut filter according to a variant of the present invention.

In still another embodiment, the infrared cut filter 1a may be modified to give an infrared cut filter 1e shown in FIG. 5. The infrared cut filter 1e has the same configuration as the infrared cut filter 1a, except that the intermediate protective layer 30 is disposed between the organic dye-containing layer 10 and the copper phosphonate-containing layer 20 and that an anti-reflection film 40 is provided to form a surface of the infrared cut filter 1e. As such, the infrared cut filter 1e has an increased transmittance in the visible region. Thus, for example, the use of the infrared cut filter 1e in an imaging device such as a digital camera allows a bright image to be obtained. Depending on the situation, the intermediate protective layer 30 may be omitted or, as shown in FIG. 2, the copper phosphonate-containing layer 20 may be disposed closer to the transparent substrate 50 than is the organic dye-containing layer 10.

The anti-reflection film 40 is a single-layer film or a multi-layer film. When the anti-reflection film 40 is a single-layer film, the anti-reflection film 40 is made of a material having a low refractive index. When the anti-reflection film 40 is a multi-layer film, the anti-reflection film 40 is formed by alternately laminating at least one low-refractive-index material layer and at least one high-refractive-index material layer. Exemplary materials for forming the anti-reflection film 40 include inorganic materials such as $SiO_2$, $TiO_2$, and $MgF_2$ and organic materials such as fluorine resins. The process for forming the anti-reflection film 40 is not particularly limited. Any process selected from vacuum deposition, sputtering, chemical vapor deposition (CVD), and sol-gel process using spin coating or spray coating can be employed depending on the type of the material for forming the anti-reflection film 40. The anti-reflection film 40 may be formed on both sides in the thickness direction of the infrared cut filter 1e. In this case, the image to be obtained can be brighter.

The anti-reflection film 40 may have, for example, the function of protecting the infrared cut filter from moisture or hot gas, in addition to the anti-reflection function.

Figure 6:
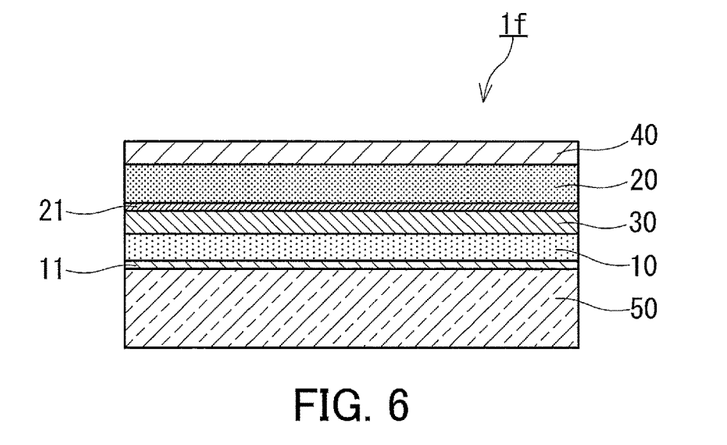
FIG. 6 is a cross-sectional view of an infrared cut filter according to a variant of the present invention.

In still another embodiment, the infrared cut filter 1a may be modified to give an infrared cut filter 1f shown in FIG. 6. The infrared cut filter 1f has the same configuration as the infrared cut filter 1a, except for including the intermediate protective layer 30 and the anti-reflection film 40 and further including an underlayer 11 for the organic dye-containing layer 10 and an underlayer 21 for the copper phosphonate-containing layer 20. Depending on the situation, at least either the intermediate protective layer 30 or anti-reflection film 40 may be omitted or, as shown in FIG. 2, the copper phosphonate-containing layer 20 may be disposed closer to the transparent substrate 50 than is the organic dye-containing layer 10.

The underlayer 11 and underlayer 21 can each be formed by applying a silane coupling agent or titanium coupling agent to the to-be-coated surface by spin coating or die coating or with a dispenser to form a coating on the surface and then by drying the coating. The underlayer 11 can enhance the adhesion of the organic dye-containing layer 10, and the underlayer 21 can enhance the adhesion of the copper phosphonate-containing layer 20. For this reason, the infrared cut filter if has high reliability. Depending on the situation, only one of the underlayers 11 and 21 may be formed.

Figure 7:
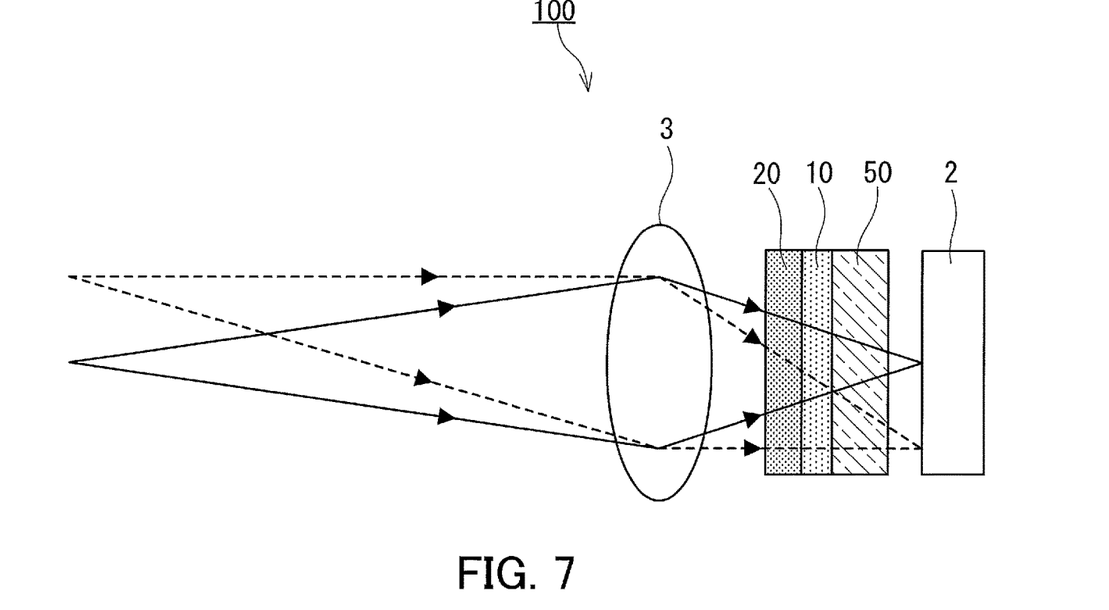
FIG. 7 shows an imaging device according to an embodiment of the present invention.

In still another embodiment, the infrared cut filter 1a is used in an imaging device such as a digital camera. As shown in FIG. 7, an imaging device 100 includes the infrared cut filter 1a and an imaging sensor 2. The imaging sensor 2 is, for example, a solid-state imaging sensor such as a CCD or CMOS. The imaging device 100 further includes an imaging lens 3. As shown in FIG. 7, light coming from an imaging target is condensed by the imaging lens 3, is rid of infrared light by the infrared cut filter 1a, and is then incident on the imaging sensor 2. This makes it possible to obtain favorable images with high color reproducibility. The imaging device 100 may include any of the infrared cut filters 1b to if instead of the infrared cut filter 1a.

EXAMPLES

The present invention will be described in more detail by way of examples. The present invention is not limited to the examples given below.

Example 1

A coating liquid for forming a copper phosphonate-containing layer was prepared as follows. An amount of 1.8 g of copper acetate and 72 g of tetrahydrofuran (THF) as a solvent were mixed. Copper acetate remaining undissolved was removed from the mixture by ultrasonic cleaning and centrifugation, giving a copper acetate solution. Next, 1 g of a phosphoric acid ester (manufactured by DKS Co., Ltd. under the trade name "PLYSURF A208F") was added to 60 g of the copper acetate solution, and the mixture was stirred to obtain a liquid A. Besides, 6 g of THF was added to 0.63 g of ethylphosphonic acid, and the mixture was stirred to obtain a liquid B. Next, the liquid B was added to the liquid A with stirring of the liquid A, and the mixture was stirred at room temperature for 16 hours. To the resulting solution was then added 12 g of toluene. After that, the solvent was evaporated at 85° C. over 3 hours. Next, 24 g of toluene was added to the solution, which was centrifuged to remove impurities and to which 36 g of toluene was then added. The solvent was then evaporated from the solution at 85° C. over 10 hours. In this manner, 5.4 g of a dispersion of fine particles of copper phosphonate was prepared. The average particle diameter of the fine particles of copper phosphonate in the dispersion was measured by a dynamic light scattering method. As a result of the measurement, the average particle diameter of the fine particles of copper phosphonate in the dispersion was determined to be 75 nm. The measurement apparatus used was a particle size analyzer, FPAR-1000, manufactured by Otsuka Electronics Co., Ltd. A silicone resin (manufactured by Shin-Etsu Chemical Co., Ltd. under the trade name "KR-300") was added in an amount of 5.28 g to 5.4 g of the dispersion of the fine particles of copper phosphonate, and the mixture was stirred for 1 hour. The coating liquid for forming a copper phosphonate-containing layer was thus obtained.

A coating liquid for forming an organic dye-containing layer was prepared as follows. To 20 g of cyclopentanone was added 0.10 g of YKR-2900 serving as an organic dye (manufactured by Yamamoto Chemicals, Inc. and having a maximum absorption wavelength of 830 nm), and the mixture was stirred for 1 hour. Next, 2 g of a polyvinyl butyral resin (manufactured by Sekisui Chemical Co., Ltd. under the trade name "S-LEC KS-10") was added, and the mixture was stirred for 1 hour. This was followed by addition of 1 g of tolylene-2,4-diisocyanate and then by stirring, giving the coating liquid for forming an organic dye-containing layer.

The coating liquid for forming an organic dye-containing layer was applied to a surface of a transparent glass substrate made of borosilicate glass and having a size of 76 mm×76 mm×0.21 mm (manufactured by Schott Corporation under the trade name "D 263") by spin coating at a rotation speed of 500 rpm to form a coating. This coating was heat-treated at 140° C. for 60 minutes and thus hardened to form an organic dye-containing layer. The thickness of the organic dye-containing layer was about 1.4 µm. The mass of the organic dye component finally contained in the organic dye-containing layer was stoichiometrically about 3.2% of the mass of total solids finally contained in the organic dye-containing layer. Next, 0.88 g of the coating liquid for forming a copper phosphonate-containing layer was applied to a 60 mm×60 mm area of the surface of the organic dye-containing layer with a dispenser to form a coating. The coating was heat-treated at 85° C. for 7 hours, then at 125° C. for 3 hours, and then at 150° C. for 1 hour and thus hardened to form a copper phosphonate-containing layer. The mass of the fine copper phosphonate particles finally contained in the copper phosphonate-containing layer was stoichiometrically was about 33% of the mass of total solids finally contained in the copper phosphonate-containing layer. In this manner, an infrared cut filter according to Example 1 was fabricated. In the infrared cut filter according to Example 1, the thickness of the portion consisting of the organic dye-containing layer and copper phosphonate-containing layer was about 123 µm.

The spectral transmittance of the infrared cut filter according to Example 1 was measured. This measurement was conducted using an ultraviolet-visible spectrophotometer (manufactured by JASCO Corporation under the trade name "V-670") at an incident angle of 0° (degree). The measurement result is shown in Table 1 and FIG. 8.

Figure 8:
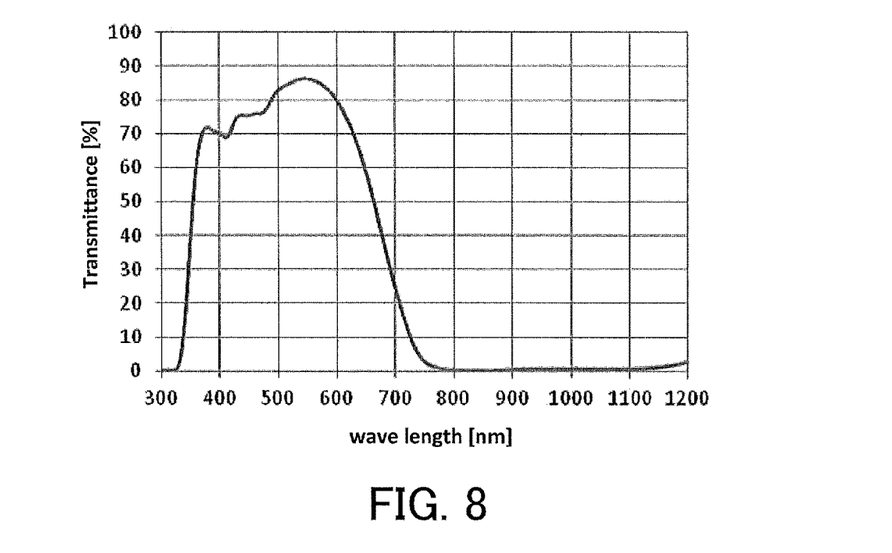
FIG. 8 shows a transmittance spectrum of an infrared cut filter according to Example 1.

As seen from FIG. 8, the infrared cut filter according to Example 1 had a high spectral transmittance of 70% or more in the wavelength range from 450 nm to 600 nm and had a spectral transmittance of 5% or less in the wavelength range from 800 nm to 1100 nm. The cut-off wavelength of the infrared cut filter according to Example 1 was about 663 nm. Furthermore, the transmittance of the infrared cut filter at a wavelength (about 763 nm) 100 nm longer than the cut-off wavelength was about 1.3%, which means that this infrared cut filter met the requirement that infrared cut filters have a transmittance of 5% or less. This suggested that the infrared cut filter according to Example 1 had infrared shielding properties desirable for an imaging device such as a digital camera.

Example 2

A coating liquid for forming an intermediate protective layer was prepared as follows. An amount of 2.83 g of glycidoxypropyltrimethoxysilane, 0.11 g of an epoxy resin (manufactured by SAKAMOTO YAKUHIN KOGYO CO., LTD. under the trade name "SR-6GL"), 5.68 g of tetraethoxysilane, 0.06 g of a nitric acid solution diluted with ethanol (nitric acid concentration: 10 wt %), and 5.5 g of water were added in this order to 11.5 g of ethanol, and the mixture was stirred for about 1 hour. The coating liquid for forming an intermediate protective layer was thus obtained.

The coating liquid used for organic dye-containing layer formation in Example 1 was applied to a surface of a transparent glass substrate made of borosilicate glass and having a size of 76 mm×76 mm×0.21 mm (manufactured by Schott Corporation under the trade name "D 263") by spin coating at a rotation speed of 300 rpm to form a coating. This coating was heat-treated at 140° C. for 60 minutes and thus hardened. In this manner, an organic dye-containing layer was formed. The thickness of the organic dye-containing layer was about 1.8 μm. Next, the coating liquid for forming an intermediate protective layer was applied to the surface of the organic dye-containing layer by spin coating at a rotation speed of 300 rpm to form a coating. This coating was heat-treated at 150° C. for 20 minutes and thus hardened. In this manner, an intermediate protective layer was formed. The mass of the polysiloxane component finally contained in the intermediate protective layer was stoichiometrically about 97% of the mass of total solids finally contained in the intermediate protective layer, and the mass of the epoxy resin in the intermediate protective layer was stoichiometrically about 2.1% of the mass of total solids finally contained in the intermediate protective layer. The thickness of the intermediate protective layer was about 1.7 μm. Next, 0.86 g of the coating liquid used for copper phosphonate-containing layer formation in Example 1 was applied to a 60 mm×60 mm area of the surface of the intermediate protective layer with a dispenser to form a coating. This coating was heat-treated at 85° C. for 3 hours, then at 125° C. for 3 hours, and then at 150° C. for 1 hour and thus hardened to form a copper phosphonate-containing layer. An infrared cut filter according to Example 2 was thus fabricated. In the infrared cut filter of Example 2, the thickness of the portion consisting of the organic dye-containing layer, intermediate protective layer, and copper phosphonate-containing layer was 122 μm.

Figure 9:
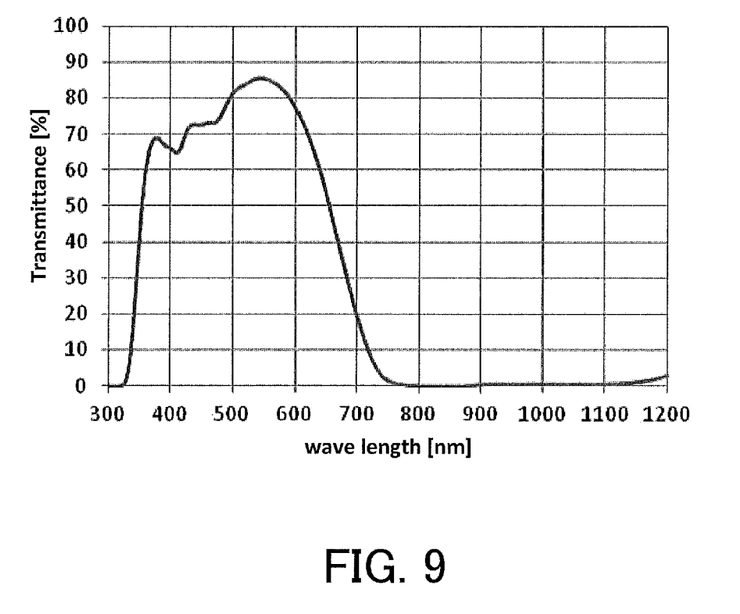
FIG. 9 shows a transmittance spectrum of an infrared cut filter according to Example 2.

The spectral transmittance of the infrared cut filter according to Example 2 was measured in the same manner as in Example 1. The result is shown in Table 1 and FIG. 9. As seen from FIG. 9, the infrared cut filter according to Example 2 had a high spectral transmittance of 70% or more in the wavelength range from 450 nm to 600 nm and had a spectral transmittance of 5% or less in the wavelength range from 800 nm to 1100 nm. The cut-off wavelength of the infrared cut filter according to Example 2 was about 655 nm. Furthermore, the transmittance of the infrared cut filter at a wavelength (about 755 nm) 100 nm longer than the cut-off wavelength was about 1.3%, which means that this infrared cut filter met the requirement that infrared cut filters have a transmittance of 5% or less. This suggested that the infrared cut filter according to Example 2 had infrared shielding properties desirable for an imaging device such as a digital camera.

Example 3

The coating liquid used for copper phosphonate-containing layer formation in Example 1 was applied in an amount of 1 g to a 60 mm×60 mm area of a surface of a transparent glass substrate made of borosilicate glass and having a size of 76 mm×76 mm×0.21 mm (manufactured by Schott Corporation under the trade name "D 263") with a dispenser to form a coating. This coating was heat-treated at 85° C. for 3 hours, then at 125° C. for 3 hours, and then at 150° C. for 1 hour and thus hardened. In this manner, a copper phosphonate-containing layer was formed. Next, the coating liquid used for intermediate protective layer formation in Example 2 was applied to the surface of the copper phosphonate-containing layer by spin coating at a rotation speed of 300 rpm to form a coating. This coating was then heat-treated at 150° C. for 20 minutes and thus hardened. In this manner, an intermediate protective layer was formed. The thickness of the intermediate protective layer was about 1.7 μm. Next, the coating liquid used for organic dye-containing layer formation in Example 1 was applied to the surface of the intermediate protective layer by spin coating at a rotation speed of 200 rpm to form a coating. This coating was heat-treated at 140° C. for 60 minutes and thus hardened to form an organic dye-containing layer. The thickness of the organic dye-containing layer was about 2.4 μm. An infrared cut filter according to Example 3 was thus fabricated. In the infrared cut filter of Example 3, the thickness of the portion consisting of the copper phosphonate-containing layer, intermediate protective layer, and organic dye-containing layer was 141 μm.

Figure 10:
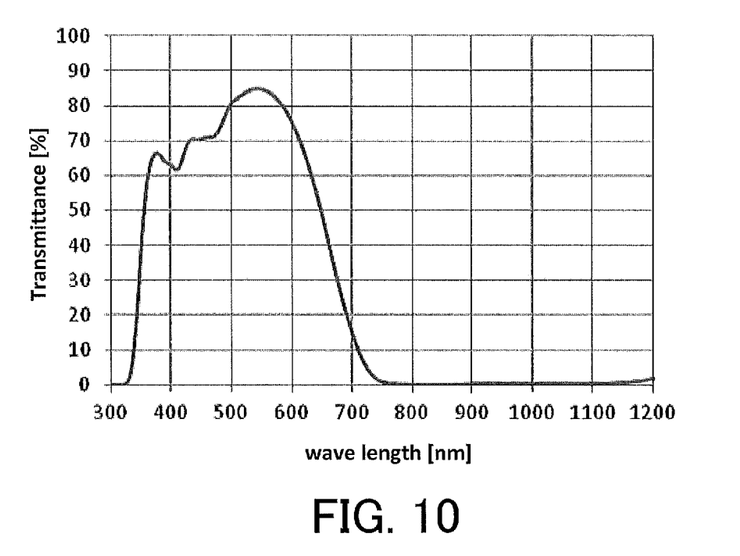
FIG. 10 shows a transmittance spectrum of an infrared cut filter according to Example 3.

The spectral transmittance of the infrared cut filter according to Example 3 was measured in the same manner as in Example 1. The result is shown in Table 1 and FIG. 10. As seen from FIG. 10, the infrared cut filter according to Example 3 had a high spectral transmittance of 70% or more in the wavelength range from 450 nm to 600 nm and had a spectral transmittance of 5% or less in the wavelength range from 800 nm to 1100 nm. The cut-off wavelength of the infrared cut filter according to Example 3 was about 648 nm. Furthermore, the transmittance of the infrared cut filter at a wavelength (about 748 nm) 100 nm longer than the cut-off wavelength was about 0.9%, which means that this infrared cut filter met the requirement that infrared cut filters have a transmittance of 5% or less. This suggested that the infrared cut filter according to Example 3 had infrared shielding properties desirable for an imaging device such as a digital camera.

Example 4

A coating liquid for forming an organic dye-containing layer was prepared as follows. To 20 g of cyclopentanone was added 0.149 g of KAYASORB CY-40MC serving as an organic dye (manufactured by Nippon Kayaku Co., Ltd. and having a maximum absorption wavelength of 835 nm), and the mixture was stirred for 1 hour. Next, 2.0 g of a polyvinyl butyral resin (manufactured by Sumitomo Chemical Co., Ltd. under the trade name "S-LEC KS-10") was added, and the mixture was stirred for 1 hour. This was followed by addition of 1.0 g of tolylene-2,4-diisocyanate and then by stirring, giving the coating liquid for forming an organic dye-containing layer.

The coating liquid for forming an organic dye-containing layer was applied to a surface of a transparent glass substrate made of borosilicate glass and having a size of 76 mm×76 mm×0.21 mm (manufactured by Schott Corporation under the trade name "D 263") by spin coating at a rotation speed of 300 rpm to form a coating. This coating was heat-treated at 140° C. for 60 minutes and thus hardened. In this manner, an organic dye-containing layer was formed. The thickness of the organic dye-containing layer was about 1.9 μm. The mass of the organic dye component finally contained in the organic dye-containing layer was stoichiometrically about 4.7% of the mass of total solids finally contained in the organic dye-containing layer. Next, the coating liquid used for intermediate protective layer formation in Example 2 was applied to the surface of the organic dye-containing layer by spin coating at a rotation speed of 300 rpm to form a coating. This coating was heat-treated at 150° C. for 20 minutes and thus hardened. In this manner, an intermediate protective layer was formed. The thickness of the intermediate protective layer was about 1.7 µm. Next, 0.60 g of the coating liquid used for copper phosphonate-containing layer formation in Example 1 was applied to a 60 mm×60 mm area of the surface of the intermediate protective layer with a dispenser to form a coating. This coating was heat-treated at 85° C. for 3 hours, then at 125° C. for 3 hours, and then at 150° C. for 1 hour and thus hardened to form a copper phosphonate-containing layer. An infrared cut filter according to Example 4 was thus fabricated. In the infrared cut filter of Example 4, the thickness of the portion consisting of the organic dye-containing layer, intermediate protective layer, and copper phosphonate-containing layer was 85 µm.

Figure 11:
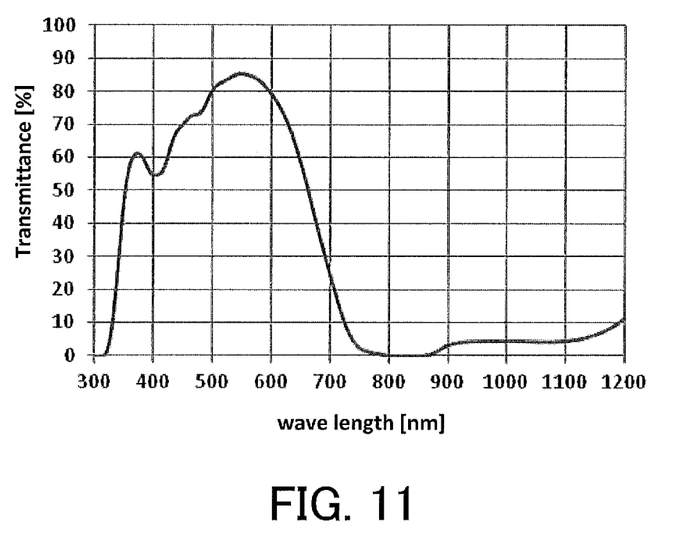
FIG. 11 shows a transmittance spectrum of an infrared cut filter according to Example 4.

The spectral transmittance of the infrared cut filter according to Example 4 was measured in the same manner as in Example 1. The result is shown in Table 1 and FIG. 11. As seen from FIG. 11, the infrared cut filter according to Example 4 had a high spectral transmittance of 70% or more in the wavelength range from 450 nm to 600 nm and had a spectral transmittance of 5% or less on average in the wavelength range from 800 nm to 1100 nm. The cut-off wavelength of the infrared cut filter according to Example 4 was about 664 nm. Furthermore, the transmittance of the infrared cut filter at a wavelength (about 764 nm) 100 nm longer than the cut-off wavelength was about 1.4%, which means that this infrared cut filter met the requirement that infrared cut filters have a transmittance of 5% or less. This suggested that the infrared cut filter according to Example 4 had infrared shielding properties desirable for an imaging device such as a digital camera.

Comparative Example 1

A coating liquid for forming a copper phosphonate-containing layer was applied in an amount of 0.7 g to a 60 mm×60 mm area of a surface of a transparent glass substrate made of borosilicate glass and having a size of 76 mm×76 mm×0.21 mm (manufactured by Schott Corporation under the trade name "D 263") with a dispenser to form a coating. This coating was heat-treated at 85° C. for 3 hours, then at 125° C. for 3 hours, and then at 150° C. for 1 hour and thus hardened to form a copper phosphonate-containing layer. In this manner, an infrared cut filter according to Comparative Example 1 was obtained in which only the copper phosphonate-containing layer was formed on the transparent glass substrate. The thickness of the copper phosphonate-containing layer of the infrared cut filter according to Comparative Example 1 was about 91 µm.

Figure 12:
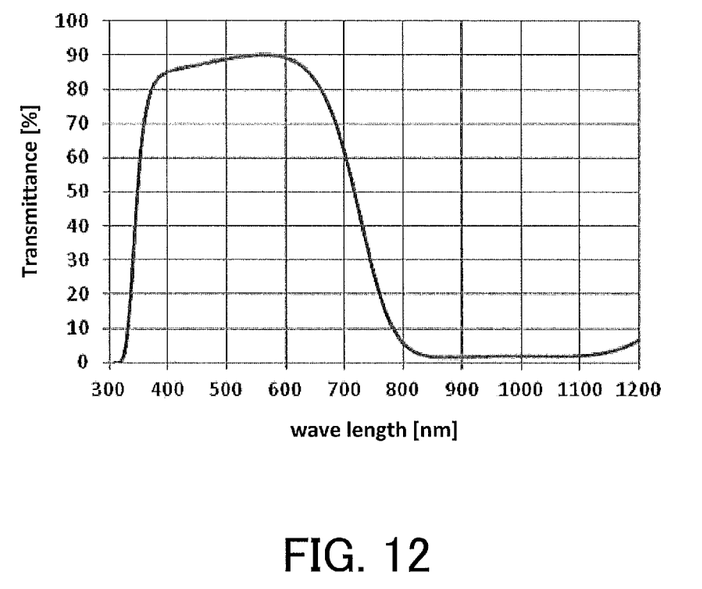
FIG. 12 shows a transmittance spectrum of an infrared cut filter according to Comparative Example 1.

The spectral transmittance of the infrared cut filter according to Comparative Example 1 was measured in the same manner as in Example 1. The measurement result is shown in Table 1 and FIG. 12. As seen from FIG. 12, the infrared cut filter according to Comparative Example 1 had a high spectral transmittance (80% or more) in the wavelength range from 450 nm to 600 nm and had a low spectral transmittance (10% or less) in the wavelength range from 800 nm to 1100 nm. However, the cut-off wavelength of the infrared cut filter according to Comparative Example 1 was about 718 nm, which means that this infrared cut filter failed to meet the requirement that infrared cut filters for use in imaging sensors have a cut-off wavelength in the wavelength range from 620 nm to 680 nm. This suggested that infrared shielding properties required of an imaging device such as a digital camera are difficult to achieve with an infrared cut filter merely having a copper phosphonate-containing layer.

Comparative Example 2

The coating liquid used for organic dye-containing layer formation in Example 1 was applied to a surface of a transparent glass substrate made of borosilicate glass and having a size of 76 mm×76 mm×0.21 mm (manufactured by Schott Corporation under the trade name "D 263") by spin coating at a rotation speed of 300 rpm to form a coating. This coating was heat-treated at 140° C. for 60 minutes and thus hardened to form an organic dye-containing layer. In this manner, an infrared cut filter according to Comparative Example 2 was obtained in which only the organic dye-containing layer was formed on the transparent glass substrate. The thickness of the organic dye-containing layer of the infrared cut filter according to Comparative Example 2 was about 1.7 µm.

Figure 13:
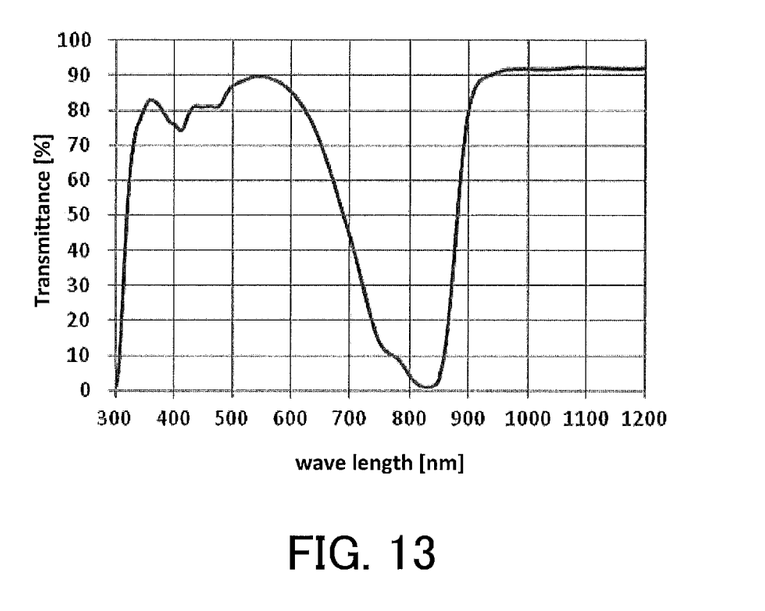
FIG. 13 shows a transmittance spectrum of an infrared cut filter according to Comparative Example 2.

The spectral transmittance of the infrared cut filter according to Comparative Example 2 was measured in the same manner as in Example 1. The measurement result is shown in Table 1 and FIG. 13. As seen from FIG. 13, the organic dye-containing layer of the infrared cut filter according to Comparative Example 2 had a generally high spectral transmittance (70% or more) in the wavelength range from 350 nm to 600 nm and had the property of absorbing light in the wavelength range from about 600 nm to about 900 nm. In addition, the organic dye-containing layer of the infrared cut filter according to Comparative Example 2 had such a property that its spectral transmittance decreased from 80% or more to 10% or less with increasing wavelength in the wavelength range from 600 nm to 750 nm. The cut-off wavelength of the infrared cut filter according to Comparative Example 2 was about 688 nm, which means that this infrared cut filter failed to meet the requirement that infrared cut filters for use in imaging sensors have a cut-off wavelength in the wavelength range from 620 nm to 680 nm. Moreover, the organic dye-containing layer of the infrared cut filter according to Comparative Example 2 had the property of exhibiting a high transmittance in the wavelength range beyond 900 nm. This suggested that infrared shielding properties required of an imaging device such as a digital camera are difficult to achieve with an infrared cut filter merely having an organic dye-containing layer.

Comparative Example 3

The coating liquid prepared for organic dye-containing layer formation in Example 4 was applied to a surface of a transparent glass substrate made of borosilicate glass and having a size of 76 mm×76 mm×0.21 mm (manufactured by Schott Corporation under the trade name "D 263") by spin coating at a rotation speed of 300 rpm to form a coating. This coating was heat-treated at 140° C. for 60 minutes and thus hardened to form an organic dye-containing layer. In this manner, an infrared cut filter according to Comparative Example 3 was obtained in which only the organic dye-containing layer was formed on the transparent glass substrate. The thickness of the organic dye-containing layer of the infrared cut filter according to Comparative Example 3 was about 1.9 µm.

Figure 14:
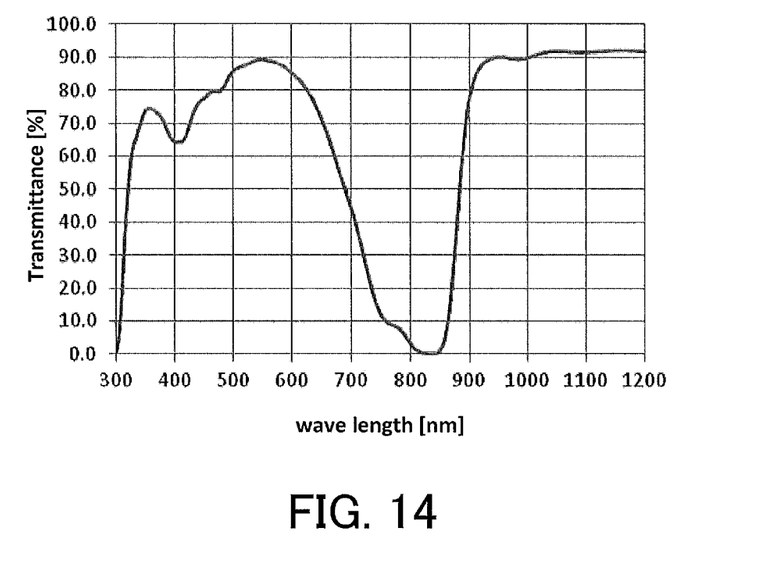
FIG. 14 shows a transmittance spectrum of an infrared cut filter according to Comparative Example 3.

The spectral transmittance of the infrared cut filter according to Comparative Example 3 was measured in the same manner as in Example 1. The measurement result is shown in Table 1 and FIG. 14. As seen from FIG. 14, the organic dye-containing layer of the infrared cut filter according to Comparative Example 3 had a generally high spectral transmittance (70% or more) in the wavelength range from 450 nm to 600 nm and had the property of absorbing light in the wavelength range from about 600 nm to 900 nm. In addition, the organic dye-containing layer of the infrared cut filter according to Comparative Example 3 had such a property that its spectral transmittance decreased from 80% or more to 20% or less with increasing wavelength in the wavelength range from about 600 nm to 750 nm. However, the cut-off wavelength of the infrared cut filter according to Comparative Example 3 fell outside the wavelength range from 620 nm to 680 nm and was specifically around 692 nm. Moreover, the infrared cut filter according to Comparative Example 3 had the property of exhibiting a high transmittance at wavelengths of 900 nm and above. This suggested that infrared shielding properties required of an imaging device such as a digital camera are difficult to achieve with an infrared cut filter merely having an organic dye-containing layer.

The invention claimed is:
1. An infrared cut filter comprising:
an organic dye-containing layer containing a first matrix resin and an organic dye dispersed in the first matrix resin; and
a copper phosphonate-containing layer containing a second matrix resin and fine particles of copper phosphonate dispersed in the second matrix,
wherein the organic dye-containing layer has a transmittance of 50% at a first wavelength in a range of 620 nm to 720 nm,
the organic dye has a maximum absorption wavelength in a range of 650 nm to 900 nm,
the copper phosphonate-containing layer has a transmittance of 50% at a second wavelength that is longer than the first wavelength,
the infrared cut filter has a spectral transmittance of 70% or more across a wavelength range from 450 nm to 600 nm,
the infrared cut filter has a spectral transmittance of 5% or less on average for a wavelength range from 800 nm to 1000 nm,

TABLE 1

| Wavelength (nm) | Spectral transmittance (%) | | | | | | |
|---|---|---|---|---|---|---|---|
| | Example 1 | Example 2 | Example 3 | Example 4 | Comparative Example 1 | Comparative Example 2 | Comparative Example 3 |
| 300 | 0.01 | 0.00 | 0.01 | 0.01 | 0.01 | 1.05 | 0.74 |
| 320 | 0.08 | 0.08 | 0.05 | 0.76 | 0.33 | 53.03 | 47.31 |
| 340 | 17.35 | 17.48 | 13.99 | 25.83 | 25.89 | 76.89 | 68.33 |
| 360 | 61.77 | 60.17 | 57.12 | 57.65 | 69.18 | 82.80 | 74.38 |
| 380 | 71.86 | 68.68 | 66.02 | 60.79 | 82.15 | 79.47 | 71.14 |
| 400 | 69.96 | 66.00 | 62.96 | 54.95 | 85.20 | 75.77 | 64.57 |
| 420 | 71.58 | 68.00 | 65.04 | 57.55 | 86.22 | 77.11 | 66.10 |
| 440 | 75.49 | 72.57 | 70.26 | 67.93 | 86.93 | 81.05 | 75.57 |
| 460 | 75.90 | 73.03 | 70.79 | 72.05 | 87.57 | 81.05 | 78.87 |
| 480 | 77.46 | 74.85 | 72.93 | 73.74 | 88.48 | 81.80 | 79.82 |
| 500 | 82.93 | 81.34 | 80.33 | 80.44 | 89.08 | 86.89 | 85.32 |
| 520 | 85.02 | 83.86 | 83.09 | 83.26 | 89.60 | 88.49 | 87.42 |
| 540 | 86.37 | 85.36 | 84.76 | 85.26 | 90.01 | 89.50 | 88.95 |
| 560 | 85.96 | 84.78 | 83.97 | 85.28 | 90.28 | 89.24 | 88.97 |
| 580 | 83.96 | 82.23 | 80.95 | 83.53 | 90.19 | 87.80 | 87.91 |
| 600 | 79.93 | 77.38 | 75.39 | 79.64 | 89.50 | 85.12 | 85.44 |
| 620 | 73.64 | 69.98 | 66.91 | 73.85 | 88.10 | 80.81 | 81.94 |
| 640 | 64.53 | 59.72 | 55.57 | 64.95 | 85.40 | 74.48 | 76.16 |
| 660 | 52.26 | 46.55 | 41.46 | 52.64 | 80.76 | 65.39 | 67.58 |
| 680 | 38.16 | 32.23 | 26.96 | 38.47 | 73.33 | 54.55 | 56.46 |
| 700 | 24.61 | 19.50 | 14.99 | 25.29 | 62.51 | 43.21 | 45.22 |
| 720 | 12.55 | 9.16 | 6.18 | 13.32 | 48.82 | 30.52 | 32.04 |
| 740 | 4.64 | 3.01 | 1.68 | 4.77 | 33.88 | 17.59 | 17.52 |
| 760 | 1.57 | 0.93 | 0.42 | 1.65 | 20.63 | 11.18 | 10.10 |
| 780 | 0.57 | 0.33 | 0.12 | 0.81 | 11.33 | 8.93 | 8.22 |
| 800 | 0.12 | 0.05 | 0.02 | 0.19 | 5.90 | 4.19 | 3.66 |
| 820 | 0.02 | 0.01 | 0.00 | 0.01 | 3.27 | 1.21 | 0.66 |
| 840 | 0.01 | 0.01 | 0.00 | 0.00 | 2.15 | 1.25 | 0.34 |
| 860 | 0.05 | 0.04 | 0.10 | 0.04 | 1.68 | 12.20 | 5.37 |
| 880 | 0.17 | 0.28 | 0.02 | 1.15 | 1.70 | 50.32 | 39.41 |
| 900 | 0.44 | 0.46 | 0.24 | 3.18 | 1.72 | 80.83 | 76.09 |
| 920 | 0.47 | 0.55 | 0.22 | 4.10 | 1.94 | 88.64 | 86.95 |
| 940 | 0.52 | 0.61 | 0.27 | 4.39 | 1.91 | 90.24 | 89.56 |
| 960 | 0.57 | 0.65 | 0.31 | 4.58 | 1.97 | 91.40 | 89.97 |
| 980 | 0.53 | 0.66 | 0.26 | 4.52 | 2.05 | 91.68 | 89.36 |
| 1000 | 0.57 | 0.65 | 0.29 | 4.54 | 2.05 | 91.70 | 89.75 |
| 1020 | 0.53 | 0.66 | 0.27 | 4.52 | 2.03 | 91.62 | 90.96 |
| 1040 | 0.51 | 0.61 | 0.25 | 4.42 | 1.98 | 91.60 | 91.67 |
| 1060 | 0.48 | 0.60 | 0.26 | 4.34 | 1.96 | 91.82 | 91.69 |
| 1080 | 0.51 | 0.59 | 0.30 | 4.33 | 1.98 | 92.15 | 91.55 |
| 1100 | 0.54 | 0.65 | 0.29 | 4.51 | 2.12 | 92.07 | 91.43 |
| 1120 | 0.67 | 0.80 | 0.36 | 5.00 | 2.43 | 92.07 | 91.71 |
| 1140 | 0.84 | 1.03 | 0.52 | 5.95 | 2.95 | 91.82 | 91.92 |
| 1160 | 1.17 | 1.40 | 0.75 | 7.15 | 3.77 | 91.73 | 92.08 |
| 1180 | 1.77 | 2.06 | 1.13 | 8.95 | 5.03 | 91.71 | 91.91 |
| 1200 | 2.63 | 2.99 | 1.79 | 11.52 | 6.76 | 91.94 | 91.74 | the infrared cut filter has a transmittance of 50% at a cut-off wavelength, and the organic dye-containing layer has a spectral transmittance that decreases from 70% or more to 50% or less as a wavelength increases from wavelength 50 nm shorter than the cut-off wavelength to a wavelength 50 nm longer than the cut-off wavelength.

2. The infrared cut filter according to claim 1, wherein the cut-off wavelength is in a range from 620 nm to 680 nm.

3. The infrared cut filter according to claim 1, wherein the organic dye-containing layer has a thickness of 0.5 μm to 5 μm.

4. The infrared cut filter according to claim 2, wherein the organic dye-containing layer has a thickness of 0.5 μm to 5 μm.

5. The infrared cut filter according to claim 1, further comprising an intermediate protective layer formed between the organic dye-containing layer and the copper phosphonate-containing layer in a thickness direction of the infrared cut filter.

6. The infrared cut filter according to claim 5, wherein the intermediate protective layer contains a polysiloxane.

7. The infrared cut filter according to claim 5, wherein the intermediate protective layer contains an epoxy resin.

8. The infrared cut filter according to claim 6, wherein the intermediate protective layer further contains an epoxy resin.

9. An imaging device comprising:
the infrared cut filter according to claim 1; and
an imaging sensor on which light passing through the infrared cut filter is incident.

10. A method for producing the infrared cut filter of claim 1, comprising applying a coating liquid containing the organic dye by spin coating to form the organic dye-containing layer.

11. The infrared cut filter according to claim 1, wherein the infrared cut filter has a spectral transmittance of 5% or less across a wavelength range from 800 nm to 1100 nm.

12. The infrared cut filter according to claim 1, wherein the organic dye-containing layer has a spectral transmittance of 80% or more on average for a wavelength range from 450 nm to 600 nm.

13. The infrared cut filter according to claim 1, wherein the copper phosphonate-containing layer has a spectral transmittance of 10% or less on average for a wavelength range from 800 nm to 1100 nm.

14. The infrared cut filter according to claim 1, wherein the copper phosphonate-containing layer has a spectral transmittance of 80% or more across a range from 400 nm to 600 nm.

15. The infrared cut filter according to claim 1, wherein a mass of the fine particles of copper phosphonate is 15% to 45% of a mass of total solids finally contained in the copper phosphonate-containing layer.

16. The infrared cut filter according to claim 1, wherein the copper phosphonate-containing layer has a thickness in a range from 40 micrometers to 200 micrometers.

17. The infrared cut filter according to claim 1, wherein the copper phosphonate-containing layer has a spectral transmittance of 5% or less across a wavelength range from 800 nm to 1000 nm.

18. The infrared cut filter according to claim 1, wherein the fine particles of copper phosphonate have an average particle diameter of 5 nm to 200 nm.

19. The infrared cut filter according to claim 1, wherein the infrared cut filter does not include a reflective infrared cut filter or reflective infrared cut coating.

20. The infrared cut filter according to claim 1, further comprising a transparent substrate, wherein at least one of the organic dye-containing layer and the copper phosphonate-containing layer is formed on the transparent substrate.

* * * * *